US006986870B1

(12) United States Patent
Brandenburg

(10) Patent No.: US 6,986,870 B1
(45) Date of Patent: Jan. 17, 2006

(54) COMBINED METHANE DECOMPOSITION AND AMMONIA FORMATION CELL

(75) Inventor: John E. Brandenburg, Cape Canaveral, FL (US)

(73) Assignee: University of Central Florida Research Foundation, Inc, Orlando, FL (US)

( * ) Notice: Subject to any disclaimer, the term of this patent is extended or adjusted under 35 U.S.C. 154(b) by 343 days.

(21) Appl. No.: 10/646,421

(22) Filed: Aug. 21, 2003

Related U.S. Application Data

(60) Provisional application No. 60/409,943, filed on Sep. 11, 2002.

(51) Int. Cl.
 *C01C 1/02* (2006.01)
 *C01C 1/04* (2006.01)
(52) U.S. Cl. ............... 422/148; 422/198; 422/211; 422/239; 423/359
(58) Field of Classification Search ............... 422/148, 422/198, 211, 239; 423/359
See application file for complete search history.

(56) References Cited

U.S. PATENT DOCUMENTS

| 4,142,993 A | 3/1979 | Elofson et al. ............. 252/447 |
| 4,180,552 A | 12/1979 | Graham et al. ............. 423/359 |
| 4,180,553 A | 12/1979 | Null et al. .................. 423/359 |
| 4,390,509 A | 6/1983 | Weston et al. .............. 423/313 |
| 4,836,898 A | 6/1989 | Noyes ........................ 204/129 |
| 4,891,202 A | 1/1990 | Lichtin et al. .............. 423/352 |
| 4,938,855 A | 7/1990 | Lichtin et al. .......... 204/157.46 |
| 4,981,669 A | 1/1991 | Pinto .......................... 423/359 |
| 5,266,175 A | 11/1993 | Murphy ................. 204/157.43 |
| 5,411,649 A | 5/1995 | Roussy et al. ......... 204/157.43 |
| 6,002,059 A | 12/1999 | Hellring et al. ............. 585/500 |
| 6,228,341 B1 | 5/2001 | Hebert et al. ............... 423/352 |
| 6,245,309 B1 | 6/2001 | Etievant et al. ............. 423/248 |
| 6,293,979 B1 | 9/2001 | Choudhary et al. ........ 48/198.7 |
| 6,333,014 B1 | 12/2001 | Filippi ........................ 423/359 |
| 6,340,451 B1 | 1/2002 | Pagani et al. ............... 423/359 |

*Primary Examiner*—Alexa D. Neckel
(74) *Attorney, Agent, or Firm*—Brian S. Steinberger; Law Offices of Brian S. Steinberger, P.A.

(57) ABSTRACT

An ammonia synthesis process and apparatus are provided which are energy efficient and minimize greenhouse-gas-emission during the processing of natural gas and air. In the process a stream of natural gas is divided into two streams, one of which is mixed with air and ignited to provide heat for the thermal decomposition of natural gas into hydrogen and carbon and also to provide deoxygenated nitrogen for an ammonia synthesis process. The process essentially prepares hydrogen and nitrogen on a low average temperature side of a chemical reactor and then feeds both gases to the high average temperature side of the chemical reactor where they react to form ammonia. The formation of ammonia is exothermic, whereas the thermal decomposition of methane is endothermic and the combustion of methane to remove oxygen is also exothermic; the sum of the heats absorbed and released in these reactions is positive. Catalysts, high temperatures and pressure are used to promote the rapid formation of ammonia, as is standard practice in the chemical industry. Catalysts, and high temperatures are used to promote the thermal decomposition of natural gas and combustion of oxygen that provides hydrogen and nitrogen for ammonia synthesis.

6 Claims, 1 Drawing Sheet

Combined Process Chemical Reactor

Combined Process Chemical Reactor

COMBINED METHANE DECOMPOSITION AND AMMONIA FORMATION CELL

This invention claims the benefit of priority to U.S. Provisional Application No. 60/409,943 filed Sep. 11, 2002.

FIELD OF THE INVENTION

This invention relates to the production of ammonia from natural gas and more particularly to an apparatus and its application to a novel method of the production of ammonia from natural gas in concurrent exothermic and endothermic processes that releases no greenhouse gases to the environment.

BACKGROUND AND PRIOR ART

It is conventional to synthesize ammonia by the Haber-Bosch process developed in the mid-twentieth century. The Haber-Bosch ammonia synthesis is accomplished by the reaction of nitrogen and hydrogen at 700° C. and requires 700 atmospheres to achieve good yields. This exothermic reaction releases heat, which must be removed from the reaction facility. Due to low conversion efficiency per pass, hydrogen and nitrogen must be recycled and ammonia removed by condensation at high pressures. Nitrogen is prepared by combustion of the oxygen from air to leave $CO_2$ and water vapor; the heat of combustion is used for thermal decomposition of methane.

Numerous patents discuss ammonia synthesis from nitrogen including:
- U.S. Pat. No. 4,142,993 which deals only with an improved Haber process, using an improved doped carbon catalyst; for ammonia synthesis;
- U.S. Pat. No. 4,180,552 to Graham, et al. again discloses an improved Haber process, which involves hydrogen recovery from ammonia synthesis in which purging streams are recycled to the reaction zone to improve ammonia yields.
- U.S. Pat. No. 4,180,553 to Null, et al. again also discloses an improved Haber process, which involves hydrogen recovery from ammonia synthesis in which purging streams are recycled to the reaction zone;
- U.S. Pat. No. 4,390,509 to Weston, et al. in which synthesis gas is used to produce ammonia and digestion of phosphate rock and eventually ammonium phosphate;
- U.S. Pat. No. 4,891,262 to Lichtin, et al. produces ammonia by catalyzed reduction of nitrogen absent photo energy;
- U.S. Pat. No. 4,938,855 to Lichtin, et al. produces ammonia by photo promoted catalyzed reduction of nitrogen; and,
- U.S. Pat. No. 4,981,669 to Pinto produces ammonia synthesis gas from natural gas by several reforming steps involving the water reforming shift process by adjusting the temperature of the reforming tubes and the air fed to the secondary reformer stage.

Hydrogen can be prepared from natural gas by water reforming or thermal decomposition. Water reforming is most often used because it is exothermic, and thus requires no energy input. Thermal decomposition is not often used because it requires energy input. In thermal decomposition, refractories are heated and natural gas is flowed over them; in the process of the endothermic decomposition the refractories cool and must be reheated. For this reason this process is not often used, as discussed in the *McGraw-Hill Encyclopedia of Science and Technology* 8$^{th}$ Ed., 1997, "Carbon Black" p. 234–235. To be cost effective the thermal decomposition process must be combined with some process or processes that release heat. With catalysts the thermal decomposition process can be made to operate at 700° C. This process is sometimes called the Bosch process.

Numerous patents discuss hydrogen synthesis in which hydrogen, if desired, can be reacted with nitrogen to produce ammonia including:
- U.S. Pat. No. 4,836,898 to Noyes discusses high temperature conversion of methane to hydrogen and carbon;
- U.S. Pat. No. 5,266,175 to Murphy and U.S. Pat. No. 5,411,649 to Roussey, et al. are concerned with conversion of a methane feed to hydrogen by microwave radiation in an electromagnetic field;
- U.S. Pat. No. 6,002,059 to Hellring, et al. is concerned with the upgrading of natural gas into higher order hydrocarbons;
- U.S. Pat. No. 6,245,309 B1 to Etievant, et al. discloses a hydrogen generator from fuel gas having a chamber provided with means for maintaining a predetermined temperature and electrical discharges at a reduced current level; and,
- U.S. Pat. No. 6,293,979 B1 to Choudhary, et al. catalytically converts natural gas to synthesis gas.

It is also known to use the exothermic energy from a reaction in one area of a plant to provide energy to facilitate the reaction of endothermic reaction in another area of the plant. Numerous patents discuss such utilization including:
- U.S. Pat. No. 6,002,059 to Hellring, et al. are concerned with the upgrading of natural gas into higher order hydrocarbons discloses the concept of balancing the heat requirements of the several steps by transferring energy from the exothermic reactions to the endothermic (see col. 7 lines 1–30).
- U.S. Pat. No. 6,228,341 B1 to Hebert, et al. also involves the transfer of energy from the exothermic reaction area to the reaction streams by indirect heat exchange through heat exchange channels.
- U.S. Pat. No. 6,245,309 B1 to Etievant, et al. discloses a hydrogen generator from fuel gas having a chamber provided with means for maintaining a predetermined temperature and electrical discharges at a reduced current level.
- U.S. Pat. No. 6,293,979 B1 to Choudhary, et al. catalytically converts natural gas to synthesis gas by a technique where the exothermic oxidative conversion of the oxygen with the natural gas is carried out in the same environment as the endothermic steam reforming of the natural gas resulting in an enhanced energy efficient environment (see col. 7, lines 15–63).
- U.S. Pat. No. 6,333,014 B1 to Filippi in a process arrangement for the co-production of ammonia and methanol, transfers energy from a hot stream by indirect heat exchange with another input stream; and,
- U.S. Pat. No. 6,340,451 B 1 to Pagani, et al. in a plant for the synthesis of ammonia and urea increases its output capacity by using a means for adjusting the various feed streams.

The methods disclosed above and their respective apparatuses are deficient in that none suggest carrying out the processing of methane or natural gas into ammonia in a limited environment that prevents the emission of greenhouse gases or utilizing the exothermic energy of one intermediate process enclosed in a reaction vessel to energize the endothermic energy consumption of a second intermediate process in said vessel and adjacent thereto for improved efficiency of production of ammonia. The importance of ammonia as a safe compound and carrier of hydrogen for fuel cells has been recognized in the new hydrogen fuel economy. Thus, the present invention fills the need for an energy efficient means to produce a safe hydrogen-containing compound, such as ammonia, from natural gas fields without harmful environmental effects.

BRIEF SUMMARY OF THE INVENTION

It is a primary objective of the invention to develop a novel method and apparatus for the production of ammonia with reduced amounts of carbon dioxide.

A second object of the invention is to develop a method and apparatus for the production of ammonia with improved efficiency.

A third object of the invention is to develop a method and apparatus for the production of ammonia with improved yield.

A fourth object of the invention is to develop a method and apparatus for converting a fossil fuel, such as natural gas, to ammonia without the release of greenhouse gases.

A preferred embodiment of the invention is the preparation of ammonia by an apparatus comprising: a reaction chamber with upper and lower reaction cavities; the lower cavity containing a third inner cavity functioning as an oxidation structure for burning of natural gas in air, said upper and lower cavities separated by a hydrogen permeable structure; means for supplying air into said lower inner reaction cavity; an oxidation structure within said lower cavity for burning said air; means for transferring nitrogen from said lower oxidation cavity to the upper reactor cavity for catalytic conversion with hydrogen and means for transferring exothermic energy from said upper reactor cavity to said lower reactor cavity whereby the additional energy need of the lower of said cavities is reduced and the method comprising the steps of: first thermally decomposing natural gas to produce hydrogen endothermically and exothermically burning natural gas in air to produce oxygen-free nitrogen; secondly thereafter scrubbing the nitrogen to remove the water and carbon oxides; thirdly reacting the hydrogen and purified nitrogen in an exothermic reaction to produce ammonia and exothermic energy; fourthly, transferring the excess energy to the endothermic reaction whereby its need for additional energy to be supplied from external sources is reduced.

DESCRIPTION OF THE PREFERRED EMBODIMENT

Figure 1:
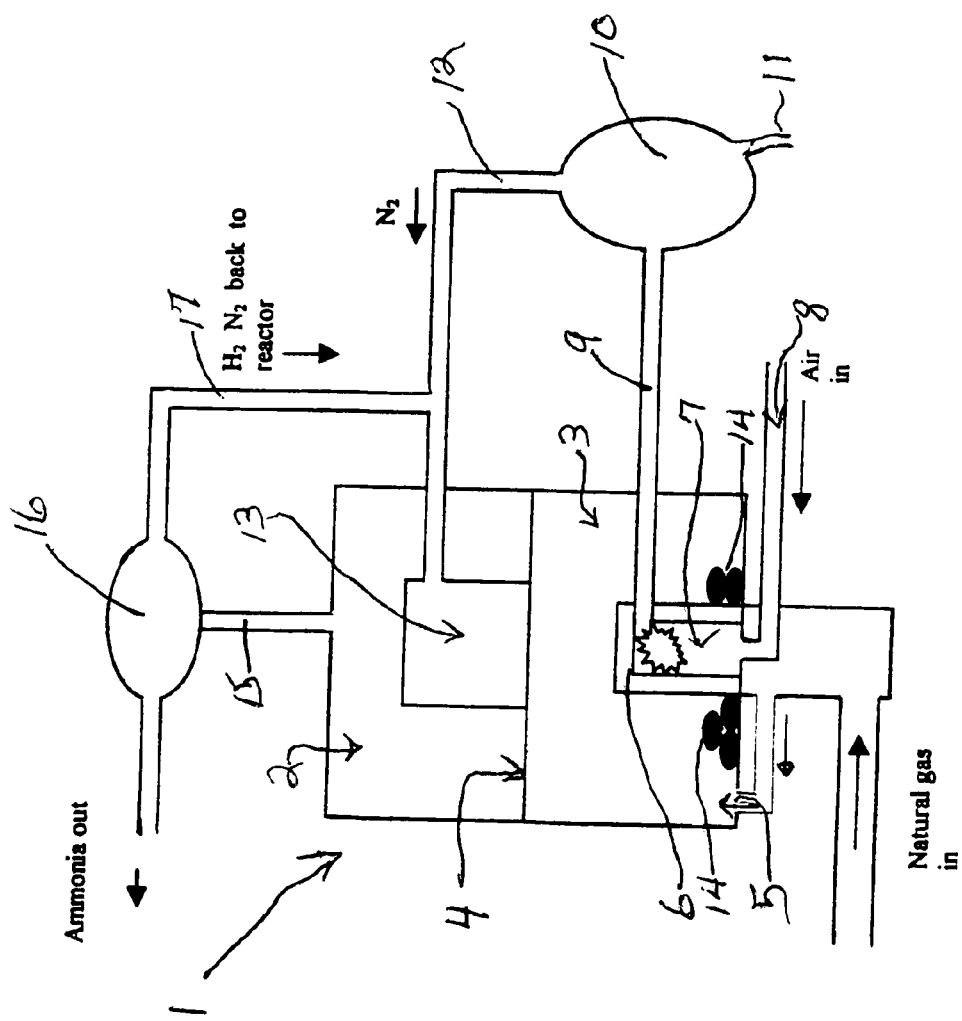
FIG. 1 shows a Combined Process Chemical (CPC) reactor.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

The invention disclosed herein in summary encompasses a device and process for converting natural gas to carbon plus ammonia in a single reactor vessel utilizing a natural gas input flow catalyzed to strip hydrogen and carbon from it in the first process and thereafter utilizing the Haber-Boesch process as the second process step in said vessel to provide ammonia in an exothermic step where the resulting heat is recycled to the endothermic first process.

The method of the invention is based on the thermal decomposition of natural gas into hydrocarbons, preferably hydrogen, and then by reaction with nitrogen into ammonia in an energy efficient manner that releases no greenhouse gases to the environment. That prevention/reduction in the release of said gases is the chief advantage of this process of this invention over the present process of making ammonia from natural gas which uses the water shift method to make hydrogen feedstock and produces large amounts of gases, primarily carbon dioxide, that are released to the environment.

Referring now to the drawing, FIG. 1, wherein characters are used to designate like or corresponding parts throughout the CPC (Combined Process Chemical) reactor which comprises an approximately cylindrical chamber 1 having an upper reaction cavity 2 and a lower reaction cavity 3 divided by a hydrogen permeable membrane 4. The hydrogen permeable membrane 4 can be palladium (Pd) metal. In the lower cavity 3, methane from the natural gas feed line 5 is heated and thermally decomposed on a hot cylinder 6 heated by the internal burning inside 7 of natural gas and air 8. The temperature and pressure of the internal region 7 is approximately one atmosphere of pressure and the combustion temperature is in a range of from about 1500° C. to about 2000° C. A pilot light or electric spark is used to ignite the natural gas and air inside the hot cylinder 6. Air that has been cleansed of oxygen is conducted out of cylinder 6 by pipe 9 to a scrubber 10 to remove carbon oxides and water using technology known to those skilled in the art. Carbon oxides and water and other by products are removed from a scrubber port 11 as limestone or calcium salts. The removal of carbon oxides, water and other by-products by the scrubber leaves a substantially pure nitrogen gas that can be sent by pipe 12 to the upper reaction cavity 2. The upper reaction cavity 2 contains an upper chamber 13 with permeable walls that creates a reservoir for the substantially pure nitrogen gas from the scrubber 10. The upper chamber 13 is conveniently located directly above the hot cylinder 6 of the lower chamber to maximize the heat transfer efficiencies between exothermic and endothermic reactions. Meanwhile, in the lower reaction cavity 3, hydrogen is released by the thermal decomposition of natural gas having methane content in the range of approximately 90 to 98 volume percent. Thus, the terms methane and natural gas are used interchangeably herein. The thermal decomposition of methane occurs in the lower reaction cavity 3 on the hot cylinder and elsewhere within the lower reaction cavity. The decomposition reaction is represented as follows:

$$CH_4 \rightarrow C_{(solid)} + 2H_{2(gas)}$$

The hydrogen gas rises and crosses through the membrane 4 to react with nitrogen in the upper cavity 2 to form ammonia. Carbon 14 formed in the lower cavity falls near the hot cylinder 6 and is removed by a suitable screw type device that allows the solid carbon residue to exit the chamber.

Ammonia is catalytically formed in and about the permeable walls of the upper chamber 13 and is removed from the upper reactor cavity 2 by a pipe 15. The reaction products in the upper reaction cavity 2 include ammonia ($NH_3$) and unreacted nitrogen ($N_2$) and hydrogen ($H_2$), which are separated in a condenser 16. The unreacted nitrogen-hydrogen mixture is a separated fraction that is returned to the stream of nitrogen gas by pipe 17.

As ammonia forms in the upper reaction cavity 2, via known catalytic reaction processes, heat is released as discussed in more detail below. The heat in the upper chamber moves via thermal conduction to the lower reaction cavity 3 because the entire reactor is made of a conductive metal, such as steel.

The process of the invention involves first the combustion of natural gas, primarily composed of methane, in air. The combustion of natural gas and air in the inner chamber 7 of the lower cavity 3 of the reaction vessel decomposes the natural gas/methane to release hydrogen and decomposes the air to release nitrogen. The combustion of methane and air is an exothermic reaction, which removes oxygen with the production of heat. Thermodynamically, it is known that the combustion of methane with oxygen produces 212.79 Kcal/-g mole. To prepare 2 moles $N_2$ from air which is 78% $N_2$ plus $O_2$ 21% (22.4 L/mole of air) $CH_4 + 2O_2 \rightarrow CO_2 + 2H_2O$ requires 1.28 moles of air per mole $N_2$, which means 2.56 moles of air for two moles $N_2$.

To burn methane ($CH_4$) in air to get rid of oxygen 0.105 mole is required per mole of air; 1.28×0.105×212.79=28.6 kcal is released to prepare one mole of purified nitrogen molecules ($N_2$) of which carbon dioxide ($CO_2$) and water ($H_2O$) can be removed by a scrubber from gas using conventional techniques. Thus, the $CO_2$ produced does not enter the atmosphere. The heat released is used to help decompose methane to produce hydrogen and carbon, a reaction, which is endothermic and requires energy of 17.889 kCal/mole to produce one mole of C and four moles of H. Whereas the synthesis of ammonia is exothermic and releases 11.04 kCal/mole of ammonia produced. When detailed mass and energy balance is performed we have for heat balance, i.e.,

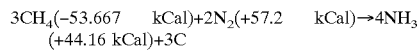

$$3CH_4(-53.667 \text{ kCal}) + 2N_2(+57.2 \text{ kCal}) \rightarrow 4NH_3(+44.16 \text{ kCal}) + 3C$$

Thus the process requires 53.667 kCal to decompose enough methane to produce 4 moles of ammonia but the production of the purified nitrogen and ammonia itself releases 101.36 kCal, which even when allowing for heat losses due to hot nitrogen plus carbon oxides and water vapor being cooled as it runs through a scrubber means that enough energy from the exothermic reactions should be available to drive the endothermic reaction. As demonstrated in the present invention, the production of ammonia from natural gas can be a net exothermic process; because, the thermal decomposition of methane is endothermic, the combustion of methane to remove oxygen is exothermic, and the formation of ammonia is exothermic; thus the sum of the heats absorbed and released within a single reaction chamber is positive.

The advantages of the present invention are several. The present invention allows the capture of hydrogen from natural gas, which is difficult to liquefy (−164° C.) and store (0.4 g/cc) into ammonia, which has a much higher density (0.8 g/cc) and is much easier to liquefy (−33° C.) in order to facilitate conversion into a hydrogen economy using ammonia as a hydrogen carrier. In addition, ammonia is readily broken down into hydrogen, which is used in fuel cells to produce water, and nitrogen, both of which can be freely vented into the air without harmful effects on the environment. Since the process utilizes exothermic processes to balance heat requirements of endothermic processes, it utilizes energy efficiently thus reduces net energy consumption and in particular, since the only carbon dioxide produced must be scrubbed from the nitrogen feedstock for the Haber process and captured, no carbon dioxide, a known deleterious greenhouse gas, is released into the atmosphere. In summary, the present invention produces ammonia, a valuable hydrogen carrier, in an energy efficient manner and without release of greenhouse gases. The use of catalysts, temperatures and pressures will allow optimization of the process for maximizing synergism between the exothermic processes of combustion and ammonia formation and the endothermic process of thermal decomposition of natural gas so as to achieve maximum ammonia production, optimal heat flows and energy efficiency.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An apparatus for the production of ammonia by the reaction of hydrogen and nitrogen comprising:
   (a) a reaction chamber with both an upper reaction cavity and a lower reaction cavity;
   (b) said upper and lower cavities separated by a hydrogen permeable structure;
   (c) a first means for supplying a gaseous hydrocarbon mixture into said lower reaction cavity;
   (d) a second means for supplying air into said lower reaction cavity;
   (e) an oxidation structure within said lower cavity for burning said air;
   (f) means for transferring nitrogen from said lower reactor cavity to the upper reactor cavity for catalytic conversion to ammonia in the presence of hydrogen; and,
   (g) means for transferring exothermic energy from said upper reaction cavity to said lower reaction cavity whereby the additional energy need of the lower of said cavities is reduced.

2. The apparatus according to claim 1 wherein said oxidation structure within the lower cavity for burning air is a hot cylinder heated by the internal burning inside of natural gas and air.

3. The apparatus according to claim 1 wherein the hot cylinder within the lower cavity is used to thermally decompose methane to form hydrogen and carbon.

4. The apparatus according to claim 1 wherein said hydrogen permeable membrane is formed of palladium (Pd) metal.

5. The apparatus according to claim 1 wherein the upper reaction cavity contains a reservoir with permeable walls to receive nitrogen gas that reacts with hydrogen gas from the lower reaction cavity to form ammonia.

6. The apparatus according to claim 5 wherein the ammonia forms during an exothermic energy reaction.

* * * * *